US007770161B2

(12) United States Patent
Mitran et al.

(10) Patent No.: US 7,770,161 B2
(45) Date of Patent: Aug. 3, 2010

(54) POST-REGISTER ALLOCATION PROFILE DIRECTED INSTRUCTION SCHEDULING

(75) Inventors: Marcel M. Mitran, Toronto (CA); Alexander A. Vasilevskiy, Montreal (CA)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 11/320,220

(22) Filed: Dec. 28, 2005

(65) Prior Publication Data

US 2007/0150880 A1    Jun. 28, 2007

(51) Int. Cl.
  G06F 9/44    (2006.01)
  G06F 9/45    (2006.01)
  G06F 17/50   (2006.01)
(52) U.S. Cl. ................. 717/151; 717/131; 716/1
(58) Field of Classification Search ............... None
  See application file for complete search history.

(56) References Cited

OTHER PUBLICATIONS

Sundaresan et al., "Experiences with Multi-threading and Dynamic Class Loading in a Java Just-In-Time Compiler", IBM Canada Ltd., Markham, Ontario Canada, pp. 1-11.

Kumar et al., "Dynamic Path Profile Aided Recompilation in a JAVA Just-In-Time Compiler", S. Sahni et al (Eds.) HiPC 2002, LNCS 2552, pp. 495-506, 2002, Springer-Verlag Berlin Heidelberg 2002.

Chen, "Effective Instruction Scheduling With Limited Registers", thesis presented to The Division of Engineering and Applied Sciences, Harvard University, Cambridge, MA, Mar. 2001, pp. pp. 1-134.

Grcevski et al, "JAVA Just-In-Time Compiler and Virtual Machine Improvements for Server and Middleware Applications", International Business Machines Corporation, 2004, Proceedings of the Third Virtual Machine Research and Technology Symposium, San Jose, CA, May 6-7, 2004, USENIX Association, pp. 1-13.

Brasier et al., "Craig: A Practical Framework for Combining Instruction Scheduling and Register Assignment", pp. 1-8, Proceedings of the 1995 IEEE International Conference on Parallel Architectures and Compilation Techniques (PACT 95), Cyprus, Jun. 1995.

Calland et al., "On the removal of anti and output dependences", Jul. 1997, Laboratoire LIP, URA CNRS 1398, Ecole Normale Superieure de Lyon, France, pp. 1-22.

Arnold et al., "A Framework for Reducing the Cost of Instrumented Code", PLDI 2001, Snowbird Utah, ACM Digital Library, pp. 1-12.

(Continued)

*Primary Examiner*—Wei Y Zhen
*Assistant Examiner*—Lanny Ung
(74) *Attorney, Agent, or Firm*—Yee & Associates, P.C.; Daniel McLoughlin (57) ABSTRACT

A computer implemented method, system, and computer usable program code for selective instruction scheduling. A determination is made whether a region of code exceeds a modification threshold after performing register allocation on the region of code. The region of code is marked as a modified region of code in response to the determination that the region of code exceeds the modification threshold. A determination is made whether the region of code exceeds an execution threshold in response to the determination that the region of code is marked as a modified region of code. Post-register allocation instruction scheduling is performed on the region of code in response to the determination that the region of code is marked as a modified region of code and the determination that the region of code exceeds the execution threshold.

18 Claims, 4 Drawing Sheets

OTHER PUBLICATIONS

Arnold et al., "A Survey of Adaptive Optimization in Virtual Machines", IBM Research Report, RC23143 Dec. 2003, updated May 2004, Computer Science, pp. 1-40.

Chen et al., "Profile-Assisted Instruction Scheduling", International Journal of Parallel Programming archive vol. 22, Issue 2 Apr. 1994 pp. 1-34.

Bradlee et al., "Integrating Register Allocation and Instruction Scheduling for RISCs", ACM Digital Library, 1991, pp. 122-131.

"The StarJIT Compiler: A Dynamic Compiler for Managed Runtime Environments", Intel Technology Journal, Managed Runtime Technologies, vol. 7, Issue 1, Feb. 19, 2003, pp. 19-31.

Pinter, "Register Allocation with Instruction Scheduling: a New Approach", Journal of Programming Languages, 1996, pp. 1-19.

Motwani et al., Combining Register Allocation and Instruction Scheduling (Technical Summary), Technical Report, Courant Institute, TR 698, Jul. 1995, pp. 1-17.

Valluri et al., "Is Compiling for Performance—Compiling for Power?" pp. 1-10, 5th Annual Workshop on Interaction between Compilers and Computer Architectures INTERACT-5, Monterey, Mexico, Jan. 2001.

Valluri et al, "Evaluating Register Allocation and Instruction Scheduling Techniques in Out-Of-Order Issue Processors", IEEE 1999, pp. 1-21. http://doi.ieeecomputersociety.org/10.1109/PACT.1999.807420.

Aggarwal et al., "Defining Wakeup Width for Efficient Dynamic Scheduling", pp. 1-6. www.iccd-conference.org/proceedings/2004/22310036.

Sharkey et al., "Power-Efficient Wakeup Tag Broadcast", pp. 1-8. www.iccd-conference.org/proceedings/ 2005/101_sharkeyj_wakeup.

Goodman et al, "Code Scheduling and Register Allocation in Large Basic Blocks", 1988, ACM Digital Library, pp. 442-452.

Sharkey et al, "Instruction Packing: Reducing Power and Delay of the Dynamic Scheduling Logic", ISLPED'05 Aug. 8-10, 2005, San Diego, CA, ACM 2005, pp. 30-35.

Gupta et al., "Resource-Sensitive Profile-Directed Data Flow Analysis for code Optimization", Proceedings of Micro-30, Dec. 1-3, 1997, Research Triangle Park, NC, IEEE 1997 pp. 1-12.

Valluri et al., "Hybrid-Scheduling: A Compile-Time Approach for Energy-Efficient Superscalar Processors", 1 page. lca.ece.utexas.edu/pubs/aceed04.pdf.

Freudenberger et al., "Phase Ordering of Register Allocation and Instruction Scheduling", Proceedings of the International Workshop on Code Generation, May 1991, pp. 146-170.

Gibbons et al., "Efficient Instruction Scheduling for a Pipelined Architecture", 1986 ACM, 0-89791-197-0/86/0600-0011, pp. 11-16.

Ullman, "NP-Complete Scheduling Problems", Journal of Computer and System Sciences 10, pp. 384-393, 1975.

Muchnick, "Advanced Compiler Design Implementation—Chapter 17: Code Scheduling", Morgan Kaufman Publishers, 1997, pp. 531-577.

SELECTIVE INSTRUCTION
SCHEDULING FRAMEWORK
FOR GIVEN MODULE M
400

*FIG. 4*

402:
```
regions_list = of code regions for instruction scheduling and register allocation.
// 1st Pass Instruction Scheduling foreach region in regions_list if ( isHot (r) ) then
            pre_register_alloc_complex_schedule (r);

elseif ( isWarm (r) ) then
            pre_register_alloc_simple_schedule (r);
        endif endforeach
```

404:
```
// Register Allocation-marks regions for post-RA scheduling foreach region r in regions_list register_allocate (r);

if ( ( weightSpills * numSpills +
               weightCopys * numCopies +
               weightExchange * numExchanges ) > threshold)
            set_reg_alloc_modified (r);
        endif endforeach
```

406:
```
// 2nd Pass on selective scheduling.

foreach region r in regions_list if ( isHot (r) &&reg_alloc_modified (r) ) then
            post-register_alloc_complex_schedule (r) ;

elseif ( isWarm ® &&reg_alloc_modified ) then
            post-register_alloc_simple_schedule (r) ;

endif endforeach
```

POST-REGISTER ALLOCATION PROFILE DIRECTED INSTRUCTION SCHEDULING

BACKGROUND OF THE INVENTION

1. Field of the Invention

The present invention relates generally to data processing, and more particularly to a computer implemented method, system, and computer usable program code for post-register allocation selective instruction scheduling.

2. Description of the Related Art

The processing speed of processors has increased at a dramatic rate over the last few years. With this increase in processing speed, there is a demand for more effective computer systems. The need for faster and more sophisticated compilers and compiling frameworks is essential to enable overall performance gains. A compiler translates code written in higher level programming languages into code executable by the computer system. Many modern compilers are dynamic compilers or Just-in-Time (JIT) compilers. A dynamic compiler translates a whole segment of code into a native code that is executable by a processor in the computer system. Machine code is an example of native code. Because dynamic compilers compile code at runtime, a program that takes a long time to compile reduces overall performance of a computer system. In addition, the program appears to execute slower to the end-user creating user dissatisfaction with the computing system and program.

Various techniques are used to reduce the performance effects of dynamic compiling. For example, instruction scheduling is a compiler or run-time technique that rearranges the execution order and functional resource allocation of the instructions compiled from a computer program so the instructions execute in the fastest and most efficient order possible. While the rearranged stream of instructions is semantically equivalent to the original stream, the instruction scheduler arranges and overlaps the execution of instructions so as to reduce overall execution time.

Unfortunately, even simple instruction scheduling requires significant compilation time as well as increasing memory and execution overhead. More complex models for instruction scheduling may further sacrifice compilation time to attain better performance in the compiled code.

Instruction scheduling may also cause conflicts with register allocation. Register allocation involves assigning variables to a limited number of hardware registers during program execution because variables in registers may be accessed more quickly than unassigned variables. Because there are far more variables than registers, multiple variables assigned to the same register may have conflicts. The goal of register allocation is to assign variables that do not conflict so as to minimize the use of non-register memory.

For example, if instruction scheduling occurs before register allocation, the rescheduled code tends to increase register motion including register spills and spill instructions which may break instruction groupings and introduce pipeline stalls and other compilation delays. Register spills occur when there are insufficient registers available for all of the variables that need to be stored and memory instead of registers must be used.

If register allocation precedes instruction scheduling, the assignment of a limited number of real registers to an indefinite number of virtual registers may create false constraints on dependencies between instructions. These dependencies may limit instructions from being moved or organized effectively, especially in systems with relatively small register sets. As a result, effective instruction scheduling has been limited because of problems balancing register allocation and performance limitations.

SUMMARY OF THE INVENTION

The aspects of the present invention provide a computer implemented method, system, and computer usable program code for selective instruction scheduling. A determination is made whether a region of code exceeds a modification threshold after performing register allocation on the region of code. The region of code is marked as a modified region of code in response to the determination that the region of code exceeds the modification threshold. A determination is made whether the region of code exceeds an execution threshold in response to a determination that the region of code is marked as a modified region of code. Post-register allocation instruction scheduling is performed on the region of code in response to the determination that the region of code is marked as a modified region of code and the determination that the region of code exceeds the execution threshold.

BRIEF DESCRIPTION OF THE DRAWINGS

The novel features believed characteristic of the invention are set forth in the appended claims. The invention itself, however, as well as a preferred mode of use, will best be understood by reference to the following detailed description of an illustrative embodiment when read in conjunction with the accompanying drawings, wherein:

DETAILED DESCRIPTION OF THE PREFERRED EMBODIMENT

Figure 1:
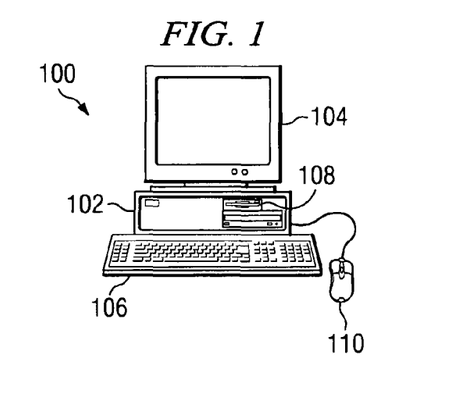
FIG. 1 is a pictorial representation of a data processing system in which the aspects of the present invention may be implemented.

With reference now to the figures and in particular with reference to FIG. 1, a pictorial representation of a data processing system is shown in which the aspects of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
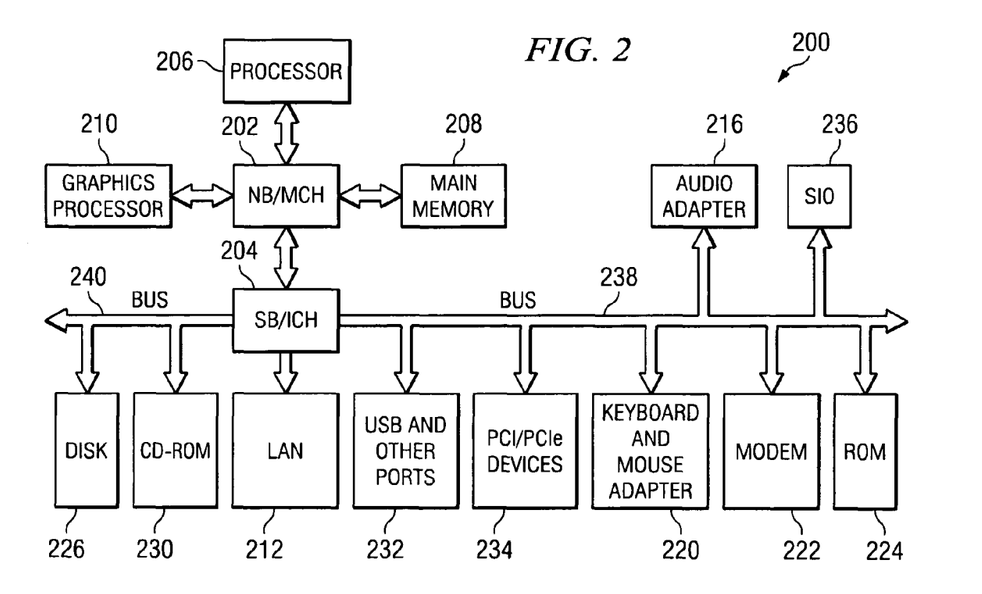
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 connect to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provides calls to the operating system from Java® programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different embodiments of the present invention provide a computer implemented method, system, and computer usable program code for selective instruction scheduling in dynamic or runtime compilers. Post-register allocation instruction scheduling is performed only on blocks of code modified during register allocation and blocks of code that are hot or warm. "Hotness" or hot, warm, or cold blocks refers to how frequently the block of code is executed. Hot blocks are executed frequently, warm blocks are executed infrequently, and cold blocks are rarely if ever executed. Hot blocks are executed more frequently than warm blocks and warm blocks are executed more frequently than cold blocks.

The process according to an aspect of the present invention performs classic pre-register allocation instruction scheduling on virtual registers. The process performs register allocation marking blocks of code in which extra instructions are inserted. The process performs post-register allocation instruction scheduling selectively on blocks that have been marked by the register allocator as modified and have "hotness" greater than a predetermined execution threshold. In these illustrative examples, the execution threshold establishes how frequently a region of code is executed to be considered hot, warm, or cold. The execution threshold indicates whether the region of code would benefit from selective instruction scheduling based on hotness. The execution threshold may be defined by dynamic profiling and using language semantics among many options. Dynamic profiling may include information and execution statistics gathered by the dynamic compiler during execution. Execution statistics may include the frequency of execution, execution time, dependencies, and any other information that details how and when regions of code are executed. Using language semantics may involve analyzing regions of code to determine how often the code may be executed in the future. For example, exceptions or errors that are outside the normal flow of the code may not be executed very often and may be used to establish that the region of code is cold.

Figure 3:
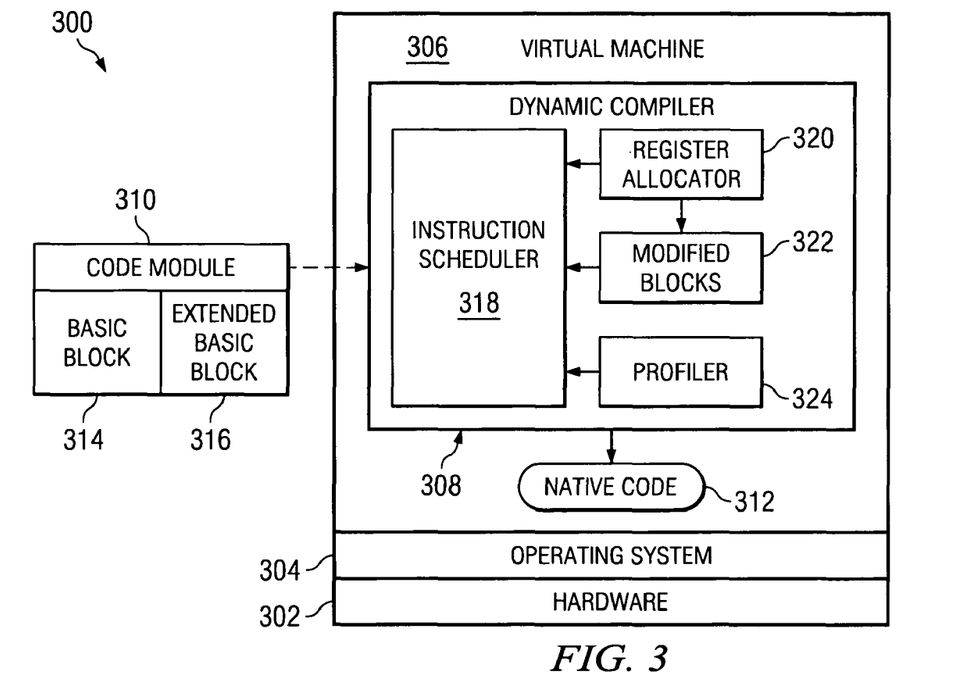
FIG. 3 is a block diagram of a runtime environment in accordance with an illustrative embodiment of the present invention.

FIG. 3 is a block diagram of a runtime system in accordance with an illustrative embodiment of the present invention. Computer 300 includes hardware 302, operating system 304, virtual machine 306, and dynamic compiler 308. Computer 300 may be a computing device, such as computer 100 of FIG. 1.

Hardware 302 includes a central processing unit for processing instructions, memory for storing and accessing data, applications, and instructions, and registers for temporarily storing instructions in a high-speed memory location in addition to those elements described in FIG. 1 and FIG. 2. A set of registers refers to at least one hardware register linked for use by the central processing unit. Virtual machine 306 is a runtime environment defined and implemented in software rather than hardware that runs dynamic compiler 308. Dynamic compiler 308 compiles code into native code that is executable by hardware 302, such as one or more processes, at runtime. In order to effectively improve performance, dynamic compiler 308 needs to know whether instructions should be reorganized and when and what to reorganize.

Code module 310 is converted by dynamic compiler 308 into a form of native code executable on hardware 302. Code module 310 may be source code or modules from a program application. Native code 312 is machine code for the user's specific type of hardware 302 and operating system 304. For example, dynamic compiler 308 may be a Java® just-in-time compiler running code module 310 which may be a Java® method. Java® bytecode is information with the Java® method that may be run on any platform within virtual machine 306 to execute an application or produce native code 312. Java® bytecodes are compact and portable which makes them suitable for storing and transferring a program.

Code module 310 may be broken down into multiple distinct regions during instruction scheduling and register allocation. In one example, regions of code within code module 310 may include basic block 314 and extended basic block 316. Basic block 314 is a sequence of instructions with a single entry point, single exit point, and no internal branches or labels. Extended basic block 316 is multiple basic blocks that are fused together including instructions between labels.

Dynamic compiler 308 includes various elements and modules for improving performance including instruction scheduler 318, register allocator 320 which creates modified blocks 322, and profiler 324. Instruction scheduler 318 performs instruction scheduling by rearranging instructions within code module 310 when generated. Instruction scheduler 318 preserves semantics within code module 310 allowing code module 310 to be executed faster when converted to native code 312 because of streamlining, grouping, pipelining, and parallel processing.

Pre-register allocation instruction scheduling is performed on virtual registers or pseudo-registers which allows instruction scheduler 318 to arrange instructions assuming that there are an unlimited number of virtual registers. Post-register allocation instruction scheduling is used to reorder any register operation instructions introduced during register allocation. If register allocation does not insert new instructions into a region of code, there is no performance benefit to be obtained by rescheduling the region.

Register allocator 320 multiplexes a large number of target program variables previously mapped to virtual registers onto a small number of central processing unit registers during program execution. Variables in registers may be accessed much quicker than those not in registers. Typically, however, there are far more variables than registers. As a result, it is necessary to assign multiple variables to registers. Variables conflict with each other if one is used both before and after the other within a short period of time, such as within a subroutine. The goal is to assign variables that do not conflict to each register to minimize the use of non-register memory.

Register allocator 320 introduces three issues during register allocation that reduce performance by requiring additional instructions. These issues are register spills, register copies, and register exchange.

Register spills occur when there are insufficient registers to store all the live variables at a program point and the additional values are stored on the stack. Register allocation generates spill stores to put values onto the stack and loads to reload values back into registers. Register spills may potentially introduce pipeline stalls. Introducing spills may cause the store queue to fill prematurely, which on many processors, requires a stall in execution until the queue is no longer full.

Register copies involve copying the value of one register into another register. Register copies may be required when a value kept in a register needs to be preserved for futures use, but the current instruction changes the value of the register. For example, in some processors if a value residing in register 0 is to be used as the base register for a memory reference, a register copy is necessary. Typically register copy instructions are not an excessive burden, requiring at most one cycle for execution.

In cases where register copies are insufficient in accommodating all the dependencies, register exchanges provide an alternative to spilling and reloading the values. Register exchanges usually require at least three instructions to implement. For example, common techniques including using three XOR instructions or two non-destructive add and a non-destructive subtract.

Register allocator 320 keeps a history of blocks of code modified during allocation. Particularly, register allocator 320 counts and records the number of register spills, register copies, and register exchanges. A weight is assigned to each register transaction, that is, to each register spill, register copy and register exchange, and the weight may be multiplied by the number of associated register transactions to form a weighted sum of all of the register transactions. This weighted sum is used to guide post-register allocation scheduling. If the weighted sum exceeds a specified modification threshold, the corresponding region of code is marked for instruction rescheduling and modified blocks 322 are created. For example, register spills and register exchanges may add multi-cycle delays, while register copies are inexpensive operations. The modification threshold may be user specified based on hardware 302 architecture and operating system 304 of computer 300. In one illustrative embodiment, the modification threshold for creating modified blocks 322 is that at least one of the following occurs: at least one register spill, three or more register copies, or at least one register exchange. For example, if basic block 314 adds two register copies during register allocation, basic block 314 is not marked as modified blocks 322. If however, extended basic block 316 adds one register exchange during register allocation, extended basic block 316 is marked as modified blocks 322.

In order to better direct efficiency improvement phases, profiler 324 within dynamic compiler 308 gathers runtime profiling during executions of code module 310. Profiler 324 is coupled to instruction scheduler 318 to monitor code execution over time. Profiler 324 dynamically sends information to instruction scheduler 318 to reflect the current behavior of the program in the runtime environment. A previous execution provides information about the executed paths and the values manipulated by code module 310. A heuristic based on path proofing data may be used by profiler 324 to dictate to instruction scheduler 318 the regions in code module 310 that may benefit from instruction scheduling. For example, if profiler 324 shows that a particular region, such as basic block 314 in code module 310 is never executed, then performing instruction scheduling on such regions will likely not yield improvements of the runtime performance. Similarly, if a region such as extended basic block 316 is executed frequently, then performing instruction scheduling to generate more efficient code may lead to better runtime performance and more efficient instruction scheduling.

In another illustrative embodiment, language semantics may be used to request instruction scheduling. For example, in Java®, any blocks that throw or catch exceptions are usually rarely executed, and thus, may not benefit from instruction scheduling. Exceptions are the customary procedure used in Java® to indicate to a calling method that an abnormal condition has occurred. For example, an error that is unexpected or a program decision that is outside the normal flow of events.

Instruction scheduler 318 may determine upon which regions of code to perform instruction scheduling based on instructions from profiler 324. For example, in rarely executed regions or cold regions, instruction scheduling may be skipped. In one illustrative embodiment, if the region of code is executed more than 10% of the time it is a hot region, code executed between 1%-10% of the time is a warm region, and code executed below 1% of the time is considered a cold region.

Figure 4:
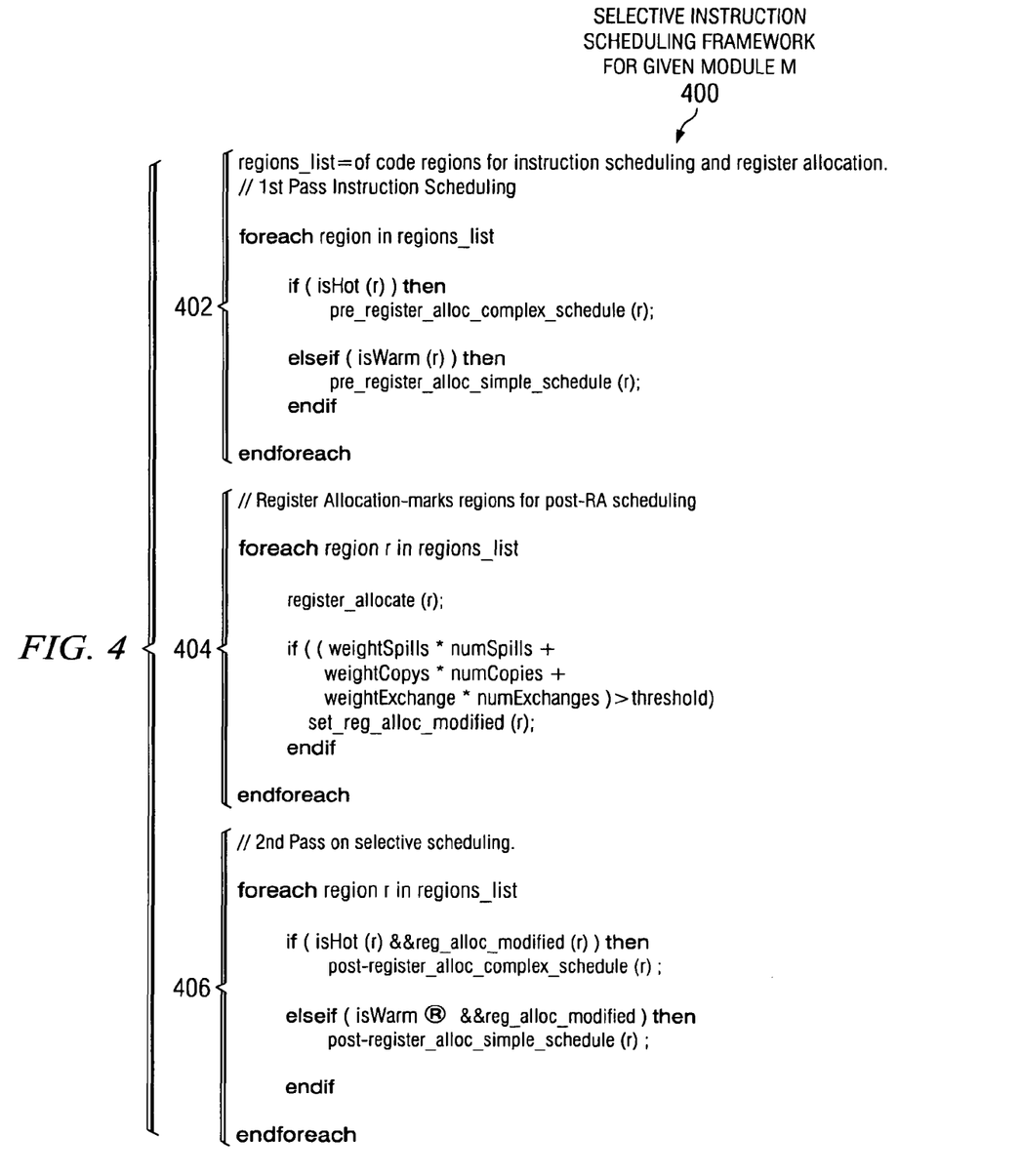
FIG. 4 is computer usable instructions illustrating selective instruction scheduling in accordance with an illustrative embodiment of the present invention.

FIG. 4 is computer usable instructions illustrating selective instruction scheduling in accordance with an illustrative embodiment of the present invention. Selective scheduling instructions 400 are broken down into three sections of instructions including first pass section 402, register allocation section 404, and selective scheduling section 406. Selective scheduling instructions 400 are used by a dynamic compiler, such as dynamic compiler 308 of FIG. 3 to efficiently process instruction blocks or regions of code, such as code module 310 also of FIG. 3 for execution.

First pass section 402 may include instructions for pre-register allocation instruction scheduling that may be initially performed. Register allocation section 404 marks specific regions of code for post-register allocation scheduling. Register allocation may be performed by a register allocator such as register allocator 320 of FIG. 3. Regions or blocks are marked if they exceed a specified modification threshold. The modification threshold may be specified by multiplying an operation weight by the number of operations. The operations may include spills, copies, exchanges, or other operations indicative of a modified region of code. In one illustrative embodiment, the modification threshold for creating a modified block is that at least one of the following occurs: at least one register spill, three or more register copies, or at least one register exchange.

Selective scheduling section 406 includes instructions for determining when a second pass of instruction scheduling should occur. In the present example, selective instruction scheduling occurs when a region of code is hot or warm and has been marked as a modified block or region. Post-register instruction scheduling may be performed for regions of code that are hot meaning frequent execution or warm meaning infrequent execution. Hot regions are executed more often than warm regions with cold regions rarely if every executed. The exact number of executions for a hot and warm region will vary in different implementations of the aspects of the present invention. Hot and warm regions are most likely to benefit from instruction scheduling enhancing execution efficiency. Cold regions or regions that are rarely executed may not undergo post-register instruction scheduling to reduce compilation time in the runtime environment.

Figure 5:
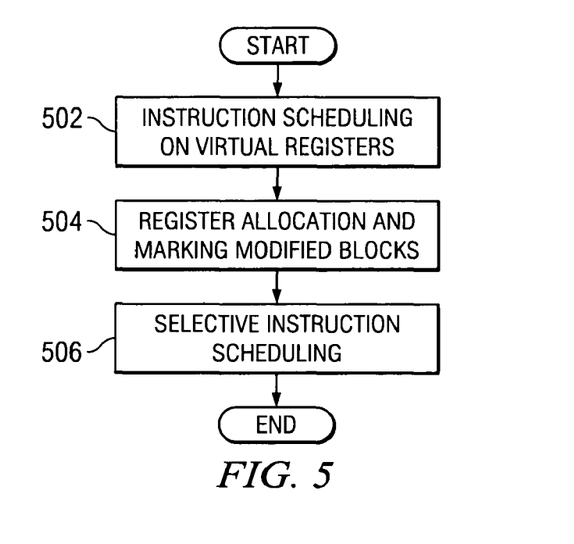
FIG. 5 is a flowchart illustrating selective instruction scheduling in accordance with an illustrative embodiment of the present invention.

FIG. 5 is a flowchart illustrating selective instruction scheduling in accordance with an illustrative embodiment of the present invention. The process described in FIG. 5 may be implemented by a dynamic compiler, such as dynamic compiler 308 of FIG. 3. The process begins by performing instruction scheduling on virtual registers (step 502). Instruction scheduling may be performed by an instruction scheduling module, such as instruction scheduler 318 of FIG. 3.

Next, the process performs register allocation and marks modified blocks (step 504). The process of register allocation may be performed by a register allocator, such as register allocator 320 of FIG. 3 in which blocks, such as modified blocks 322 of FIG. 3, are marked as modified by the register allocation process.

The process then performs selective instruction scheduling (step 506) with the process terminating thereafter. The selective instruction scheduling may be performed by an instruction scheduler, such as instruction scheduler 318, based on information such as from modified blocks 322 and profiler 324, all of FIG. 3.

Figure 6:
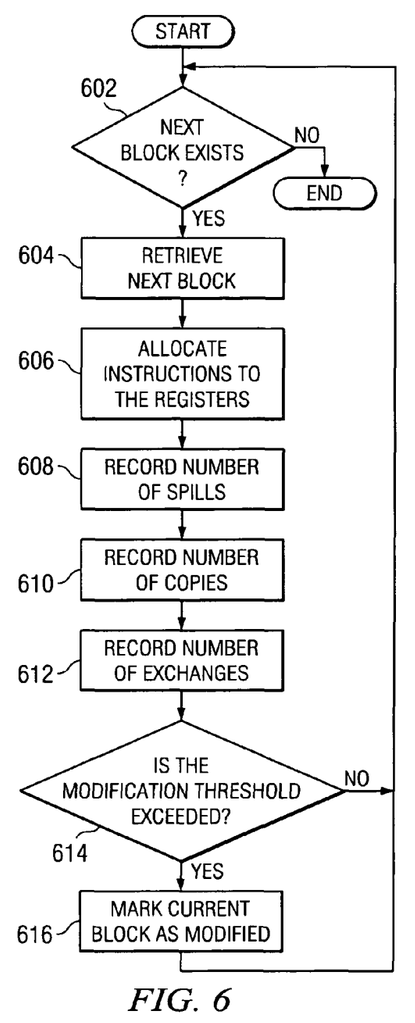
FIG. 6 is a flowchart illustrating register allocation in accordance with an illustrative embodiment of the present invention.

FIG. 6 is a flowchart illustrating register allocation in accordance with an illustrative embodiment of the present invention. The process of FIG. 6 is a more detailed depiction of step 504 of FIG. 5. The process begins by determining whether a next block exists (step 602). The next block is another region of code that is being prepared for execution by the dynamic compiler. If the process determines there is not another block, the process ends.

If the process determines that there is another block in step 602, the next block is retrieved (step 604). The process then allocates instructions to the registers (step 606), that is, the instructions are allocated to hardware registers. During the allocation process, the process records the number of spills (step 608), the number of copies (step 610), and the number of exchanges (step 612).

The process then determines whether the modification threshold is exceeded (step 614). The modification threshold is a weighted number based on the weight given to spills, copies, and exchanges as well as the number of spills, copies, and exchanges as recorded in steps 608, 610, and 612. A block of code that exceeds the modification threshold may have undergone significant modifications during register allocation and may benefit from additional instruction scheduling. The modification threshold may be set automatically or manually based on system performance or target architecture on which the code is executed.

If the modification threshold is exceeded in step 614, the process marks the current block as modified (step 616) and returns to step 602. Only blocks that exceed the modification threshold are marked as modified (step 616). If the modification threshold is not exceeded in step 614, the process returns to step 602.

Figure 7:
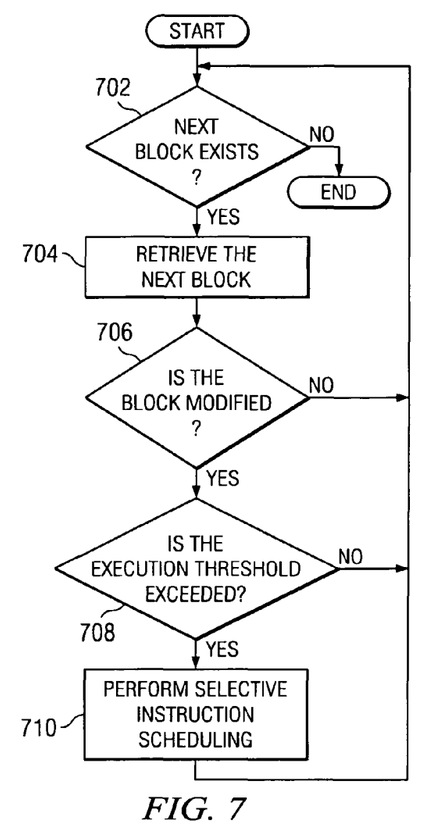
FIG. 7 is a flowchart illustrating selective instruction scheduling in accordance with an illustrative embodiment of the present invention.

FIG. 7 is a flowchart illustrating selective instruction scheduling in accordance with an illustrative embodiment of the present invention. The process of FIG. 7 is a more detailed depiction of step 506 of FIG. 5. The process begins by determining whether a next block exists (step 702). If the next block does not exist, the process ends. If the next block does exist in step 702, the next block is retrieved (step 704). The process then determines whether the block is modified (step 706). The block is modified if the modification threshold, a weighted number based on the number of spills, copies, and exchanges that occurred during register allocation, is exceeded. The determination of step 706 is based upon whether the block has been marked as modified as per step 614 of FIG. 6. If the block is not modified, the process returns to step 702.

If step 706 determines that the block is modified, the process determines whether the block exceeds the execution threshold (step 708). The execution threshold is based on the hotness of the block or region of code. In one example, the execution threshold is exceeded if the block is hot or warm. If the execution threshold is not exceeded, the process returns to step 702. If the execution threshold is exceeded in step 708, the process performs selective instruction scheduling (step 710) with the process returning to step 702. In one illustrative embodiment, selective instruction scheduling is performed on blocks that are modified and hot as determined in steps 706 and 708. In another illustrative embodiment, the process may not perform selective instruction scheduling immediately, but instead may schedule the block for selective instruction scheduling at a later time.

Illustrative embodiments of the present invention may reduce the compilation costs of instruction scheduling while maintaining the performance gains of instruction scheduling optimization. Post-register allocation instruction scheduling is performed only on blocks of code modified during register allocation and blocks of code that are hot or warm.

The invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include % compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selective instruction scheduling, the computer implemented method comprising:

determining whether a region of code exceeds a modification threshold after performing register allocation on the region of code;

recording a number of register spills, a number of register copies and a number of register exchanges that occur during register allocation responsive to determining that the region of code exceeds the modification threshold, marking the region of code as a modified region of code;

responsive to marking the region of code as the modified region of code, determining whether the region of code exceeds an execution threshold;

and responsive to determining that the region of code is marked as a modified region of code and determining that the region of code exceeds the execution threshold, performing post-register allocation instruction scheduling on the region of code.

2. The computer implemented method of claim 1, wherein the execution threshold is based on hotness and comprises one of a hot threshold, a warm threshold, and a cold threshold.

3. The computer implemented method of claim 2, wherein the hot threshold is defined as the region of code being executed more than 10% of the time, the warm threshold is defined as the region of code being executed between 1%-10% of the time, and the cold threshold is defined as the region of code being executed less than 1% of the time.

4. The computer implemented method of claim 3, wherein the execution threshold is one of the warm threshold or the hot threshold.

5. The computer implemented method of claim 1, further comprising assigning weights to register spills, register copies and register exchanges; multiplying the number of register spills, register copies and register exchanges by the respective weight assigned thereto to form a weighted sum of the number of register spills, the number of register copies and the number of register exchanges that occur during register allocation to determine whether the region of code exceeds the modification threshold.

6. The computer implemented method of claim 5, wherein a user specifies a weight for each of the number of register spills, the number of register copies, and the number of register exchanges to be used in the weighting and summing step.

7. The computer implemented method of claim 1, the modification threshold is that at least one of the following occurs:

(a) the number of register spills is one;
(b) the number of register copies is three;
or (c) the number of register exchanges is one.

8. The computer implemented method of claim 1, further comprising profiling the region of code during execution of the region of code to determine the execution threshold.

9. The computer implemented method of claim 8, wherein the profiling step is performed by a dynamic compiler and profile data gathered by the dynamic compiler includes at least one of execution statistics and language semantics.

10. The computer implemented method of claim 1, wherein the region of code is one of a plurality of regions of code within a module of code.

11. A system comprising:

a processor for executing an operating system and a dynamic compiler;

and a storage operably coupled to the processor for storing the operating system and dynamic compiler wherein the operating system and dynamic compiler may be loaded into a main memory for execution by the processor wherein the dynamic compiler determines whether a region of code exceeds a modification threshold after performing register allocation on the region of code, recording a number of register spills, a number of register copies and a number of register exchanges that occur during register allocation, marks the region of code as a modified region of code in response to a determination that the region of code exceeds a modification threshold, determines whether the region of code exceeds an execution threshold in response to determining that the region of code is marked as a modified region of code, and performs post-register allocation instruction scheduling on the modified region of code in response to the determination that the region of code is marked as a modified region of code and that the region of code exceeds the execution threshold.

12. The system of claim 11, wherein the dynamic compiler is a Java just-in-time compiler.

13. The system of claim 11, wherein the region of code is one of a plurality of regions of code within a module of code.

14. The system of claim 11, wherein the dynamic compiler comprises an instruction scheduler, a register allocator, and a profiler.

15. A computer program product comprising a computer usable medium including computer usable program code for selective instruction scheduling, said computer program product including:

computer usable program code for determining whether a region of code exceeds a modification threshold after performing register allocation on the region of code;

computer usable program code for recording a number of register spills, a number of register copies and a number of register exchanges that occur during register allocation computer usable program code responsive to determining the region of code exceeds a modification threshold, for marking the region of code as a modified region of code;

computer usable program code responsive to determining that the region of code has been marked as a modified region of code, for determining whether a region of code exceeds an execution threshold;

and computer usable program code responsive to the region of code being marked as a modified region of code and determining that the region of code exceeds the execution threshold, for performing post-register allocation instruction scheduling on the modified region of code.

16. The computer program product of claim 15, further comprising:

computer usable program code for profiling the region of code during execution of the region of code to determine the execution threshold.

17. The computer program product of claim 15, further comprising computer usable program code for assigning weights to register spills, register copies and register exchanges; computer usable program code for multiplying the number of register spills, register copies and register exchanges by the respective weight assigned thereto to form a weighted sum of the number of register spills, the number of register copies and the number of register exchanges that occur during register allocation to determine whether the region of code exceeds the modification threshold.

18. The computer program product of claim 15, wherein the execution threshold is one of a warm threshold or a hot threshold.

* * * * *